United States Patent
Schmidt, Jr.

[15] 3,657,767
[45] Apr. 25, 1972

[54] CATTLE HANDLING APPARATUS
[72] Inventor: Carl Oscar Schmidt, Jr., Cincinnati, Ohio
[73] Assignee: The Cincinnati Butchers' Supply Company, Cincinnati, Ohio
[22] Filed: Mar. 2, 1970
[21] Appl. No.: 15,764

[52] U.S. Cl. ...........................................................17/1 A
[51] Int. Cl. ....................................................A22b 1/00
[58] Field of Search ...............17/1 A, 1 R; 119/96, 98, 99, 119/103

[56] References Cited

UNITED STATES PATENTS

| 3,599,276 | 8/1971 | Edwards | 17/1 A |
| 2,978,737 | 4/1961 | Hughes | 17/1 A |
| 712,579 | 11/1902 | Nicholson et al. | 17/1 A |
| 3,080,604 | 3/1963 | Wistreich et al. | 17/1 R |

FOREIGN PATENTS OR APPLICATIONS

| 1,356,065 | 2/1964 | France | 17/1 A |

Primary Examiner—Lucie H. Laudenslager
Attorney—J. Warren Kinney, Jr.

[57] ABSTRACT

Beef animals are driven with regularity into the embrace of a restraining conveyor wherein they are stunned, and the legs are unobstructedly exposed for shackling at a cantilevered portion of the conveyor with no risk of injury to attendants; and then the shackled animals are automatically spaced and hoisted with unusual regularity and speed for subsequent treatment.

18 Claims, 4 Drawing Figures

Patented April 25, 1972
3,657,767
2 Sheets-Sheet 1
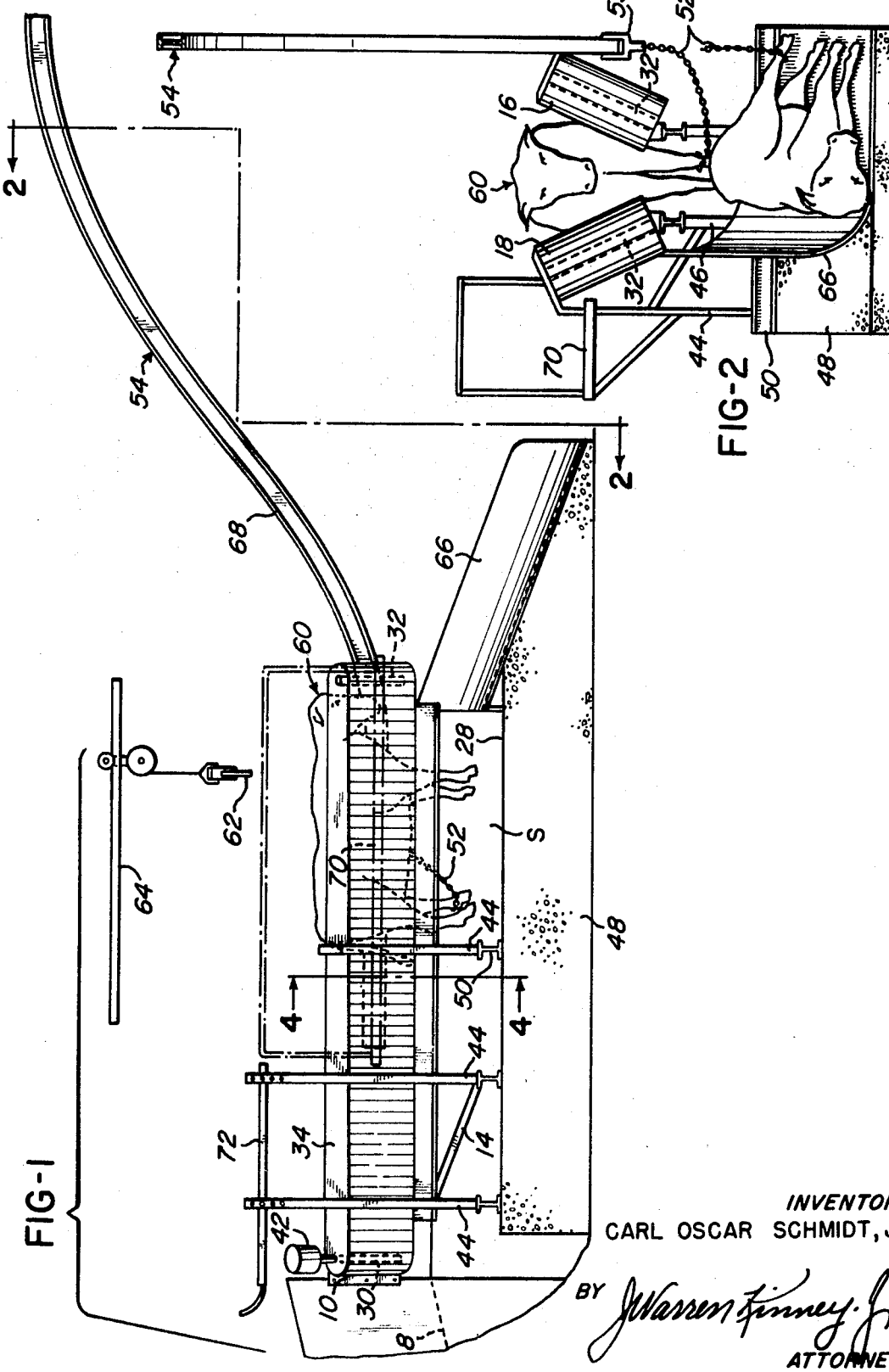
INVENTOR
CARL OSCAR SCHMIDT, JR.
BY J Warren Kinney Jr
ATTORNEY Patented April 25, 1972

INVENTOR
CARL OSCAR SCHMIDT, JR.

BY J. Warren Kinney Jr.
ATTORNEY

CATTLE HANDLING APPARATUS

The present invention relates to cattle handling apparatus, and in particular, packing plant equipment for subjecting beef animals to restraining, stunning, shackling, and bleeding preparatory to processing for the production of meat.

For the efficient operation of most commercial meat packing plants, it is highly desirable that cattle be passed through the handling equipment in a steady continuous fashion at the desired speed without interruption to the regularity of advancement through the various stages of processing. It is particularly important that regularity of advancement be established in the initial stages of processing, in order to ensure the desired regularity during the later stages.

It is accordingly an object of the resent invention to provide an effective method and means for so handling beef cattle in a packing plant or abbatoir, that the initial stunning, shackling, and bleeding steps of the procedure are performed safely with regularity and rapidity, thereby to make possible the desired regularity and speed of subsequent operations necessary to achieve high efficiency and avoid waste of time and labor in the production of meats.

Another object of the invention is to provide apparatus or equipment for achieving the purposes stated, which is compact and highly reliable in its operation eliminating agitation and bruising of the animals, and is so constructed that the work of an attendant is facilitated, expedited, and performed with unusual safety.

A further object of the invention is to provide a form of construction in equipment of the character stated, which includes a cantilevered conveyor affording greatly improved accessibility for shackling of the animal's hind leg at or near the stunning station, means being provided also for automatically hoisting the shackled animal for bleeding, without requiring the services of an attendant.

Another object is to provide equipment for the purposes stated, which is operable with a high degree of convenience and with a minimum of labor required.

The foregoing and other objects are attained by the means described herein and illustrated upon the accompanying drawings, in which:

FIG. 1 is a side elevational view of the cattle handling apparatus embodying the present invention.

FIG. 2 is an end elevation, partly in cross-section, taken on line 2—2 of FIG. 1.

Figure 3:
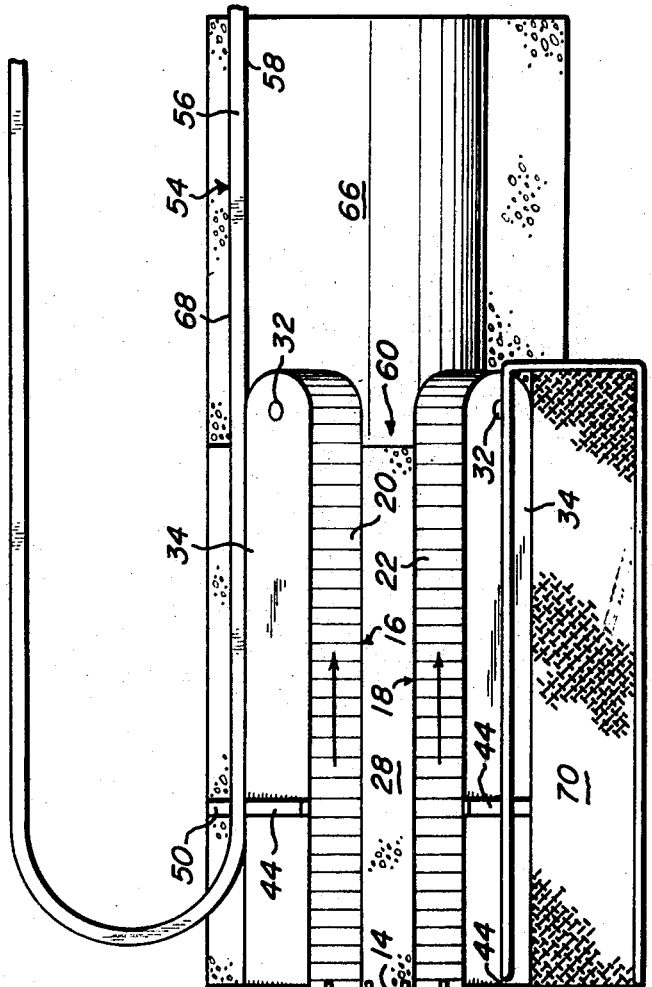
FIG. 3 is a top plan view of FIG. 1.
Figure 4:
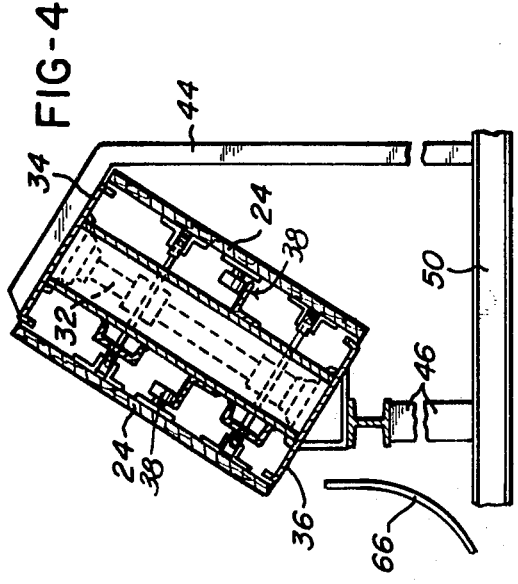
FIG. 4 is a fragmental cross-section taken on line 4—4 of FIG. 1.

In the drawings, the reference numeral 8 indicates a chute or runway leading to the entrance opening 10 of the cattle handling apparatus, where a conveyor embraces opposite sides of an animal and serves to impose physical restraint upon the animal's movements while advancing the animal bodily into the apparatus. The animal is laterally confined along the length of the runway, as by means of fencing 12, 12 while it is forced to advance on foot into the entrance 10 under the guidance of a drover, if necessary. It will be noted that the runway 8 terminates as a decending ramp 14, the purpose of which is to leave the animal bodily suspended by the conveyor while advancing, the legs of the animal being in free suspension for ease of shackling as will be explained later in detail.

The conveyor comprises two elongate endless belts 16 and 18, FIG. 3, arranged substantially horizontally in approximate parallelism, and driven so that their inner or adjacent reaches 20 and 22 travel in a common direction at equal speed, as indicated by superposed identical arrows on FIG. 3. Each conveyor belt may incorporate a plurality of sturdy elongate slats 24 fastened to the conveying belt or chain, the particular means of fastening being unimportant to the present invention. The slats of the inner reaches incline inwardly and downwardly toward a floor 28, and the spacing between said reaches is such as to support the sides of an animal while permitting the legs to dangle freely between and beneath the conveyor reaches, according to FIG. 1.

As will be apparent from FIG. 1, the animal in entering the entrance 10 at the highest level of runway 8, will remain on foot until it reaches ramp 14, when for lack of leg support the entire weight of the animal will be borne by the inner reaches of the advancing conveyor. The animal accordingly will be suspended at its sides in the manner of FIGS. 1 and 2, and will be advanced steadily at the rate of speed of the conveyor. Due to the aforesaid mode of suspension, most of the body movements of the animal are rendered powerless and inactive, to facilitate stunning and shackling of the animal.

Opposite ends of the conveyor belts may be supported in any known or conventional manner, as by means of drums or sprockets mounted on shafts 30 and 32. The upper support plate 34 and the lower support plate 36 for each conveyor section, may carry suitable track and follower means shown conventionally at 38, for keeping the conveyor or reaches in alignment upon the drums or sprockets and precluding sagging thereof under the weight of the animal supported thereby. The conveyor sections may be driven in any suitable manner. By the way of example, variable motor drives 40 and 42 designed to operate at a given speed, are shown as an acceptable simple means for driving the conveyor sections.

The upper and lower stationary plates 34 and 36 of the conveyor sections may be supported by stanchions or rigid standards 44 and 46, respectively, which latter may be effectively anchored upon a suitable foundation 48 with the aid of I-beams 50.

The plates 34 and 36 may be supported by several sets of stanchions or standards 44 and 46, but by referring to FIG. 1 it is seen that much of the length of the conveyor adjacent to the exit end 60 is unsupported, and may be considered a V-shaped trough-like overhang or cantilever projection beginning at approximately the middle of the conveyor and terminating at exit opening 60. In the example illustrated, the length of the overhang approximates the length of a beef animal. The purpose of this overhang or cantilever effect is to unobstructedly expose the depending legs of the animal for easy application of a leg shackle 52, without the risk of entanglement and possibly injuring the attendant applying the shackles.

Shackles such as 52, which may be in the form of stout chains, depend at intervals from anchorages 53 upon a shackle and bleeding conveyor 54. The conveyor may include an endless chain carrier 56 movable in a sheath 58, the carrier being movable in one direction continuously at a predetermined rate of speed to maintain always a supply of shackles at the shackling station S which is located beneath the cantilever portion of the conveyor 16, 18. This conveyor 16, 18 may hereinafter be referred to as a restraining conveyor, due to its function or restraining and securely holding the animal.

The shackle conveyor is preferably circuitous or endless of character, and repeatedly brings a succession of equally spaced captive shackles to station S at a convenient elevation above the surface of base or platform 48, where an attendant may quickly and easily grasp a shackle and apply its free end to a leg of the animal. Either prior to or after shackling, the animal may be stunned by application of a stunning device 62, usually to the head. The stunning device is conventional, and may conveniently be shifted into position for use, by moving it along a supporting rail 64 and lowering it toward the head of the animal.

After stunning, the animal is delivered through the exit opening 60 of the conveyor, and falls onto a stationary landing apron 66 which is curved and inclined to turn the animal onto its side, (FIG. 2). The landing apron has a smooth upper surface along which the animal may slide, after leaving the restraining conveyor, with its legs directed toward the bleeding conveyor 54. The smooth surface of the landing apron preferably is sloped downwardly from the exit end of the restraining conveyor, to provide a slide effective for displacing the animal by gravity from the exit 60 of the restraining conveyor.

In the vicinity of the landing apron, the conveyor 54 at 68 inclines upwardly so as to lift the shackled animal by one leg and remove it promptly from the landing apron without the assistance of an attendant. The bleeding conveyor hoists animals in succession to a proper elevation at which subsequent steps in processing are executed. Sticking of the animals to induce bleeding may be performed anytime after the animals are stunned.

It may here be noted that shackling of an animal may occur while the animal is held by the restraining conveyor, or while the animal rests upon the apron 66. In either case, the animals may be passed through the apparatus with predetermined regularity, resulting in a steady advancement of carcasses by the bleeding conveyor to various processing stations within the packing plant.

The reference numeral 70 indicates a platform upon which may be stationed an attendant who operates the stunning device 62. At 72 is indicated an overhead grid or grating located above the entrance 10, to prevent animals from jumping upwardly out of the embrace of the conveyor while a footing is available upon walkway 8. The grid or grating may be adjustable as to height, if desired.

WHAT IS CLAIMED IS: elongate

1. Animal handling apparatus comprising in combination: an animal restraining conveyor having an animal entry and an animal exit opening opposite from one another, said conveyor including opposed inner reaches extending from the entry opening to the exit opening, and means for advancing said opposed reaches at substantially equal rates of speed in the direction of said exit opening; means near the entry opening operative to deposit the full weight of an animal onto the opposed reaches of the conveyor with the legs of the animal dangling freely beneath the conveyor; cantilever support means for said conveyor providing an overhang extending from the exit opening to a location intermediate the opposite ends of the conveyor, the space beneath the overhang being substantially unobstructed to facilitate the application of a free end of a shackle to a dangling leg of said animal; a bleeding conveyor for supporting a plurality of shackles movable in a direction away from the restraining conveyor, said shackles each having an anchor end supported by the bleeding conveyor; said bleeding conveyor being inclined upwardly at a location beyond the exit opening of the restraining conveyor, to bodily lift and suspend the animal at an elevation substantially higher than that of said exit opening.

2. The apparatus as defined in claim 1, wherein the length of the overhang provided by said cantilever support means approximates the length of a beef animal.

3. The apparatus as defined by claim 2, wherein is included in the combination a landing apron located to receive an animal discharged from the exit opening of the restraining conveyor, said apron including an inclined upper slide surface sloped to direct the shackled leg of the animal toward the bleeding conveyor.

4. The apparatus as defined by claim 1, wherein the length of the overhang provided by said cantilever support means approximates half the length of the restraining conveyor.

5. The apparatus as defined by claim 4, wherein is included in the combination a landing apron located to receive an animal discharged from the exit opening of the restraining conveyor, said apron including an inclined upper slide surface sloped to direct the legs of the animal toward the bleeding conveyor.

6. The combination as defined by claim 1, wherein is included a landing apron located to receive an animal discharged from the exit opening of the restraining conveyor, said apron including an inclined upper slide surface sloped to direct the shackled leg of the animal toward the bleeding conveyor.

7. The combination as defined by claim 6, wherein the slope of said apron surface is such as to direct the shackled leg of the animal generally toward the upwardly inclined portion of the bleeding conveyor.

8. The combination as defined by claim 1, wherein said inner reaches of the restraining conveyor are inclined as a V-shaped trough to support opposite sides of the animal while advancing toward the exit end opening aforesaid.

9. The combination as defined by claim 8, wherein the length of the overhang provided by said cantilever support means is not substantially less than the length of a mature beef animal.

10. The combination as defined by claim 9, wherein is included a landing apron located to receive an animal discharged from the exit opening of the restraining conveyor, said apron including an inclined upper slide surface to direct the legs of the animal generally toward the upwardly inclined portion of the bleeding conveyor.

11. Animal handling apparatus comprising in combination: an elongate restraining conveyor having an animal entry and an animal exit opening opposite and distant from one another, said conveyor including opposed inner reaches extending from the entry opening to the exit opening, and spaced apart to bodily support an animal at its sides, and means for moving said opposed reaches at substantially equal rates of speed in the direction of said exit opening; a runway arranged to direct animals into the entry opening of the conveyor, said runway terminating as a ramp directed downwardly between the entry opening and the middle portion of the conveyor, the slope and the length of the ramp being gauged to eventually deny support to the legs of an animal during advancement of the animal toward the exit opening, thereby resulting in a transfer of the full weight of the animal to the conveyor reaches with the legs of the animal dangling freely beneath the conveyor for easy shackling; a cantilever support means for a portion of said restraining conveyor, providing an overhang extending from the exit opening to a location intermediate the opposite ends of the conveyor, the space beneath the overhang being substantially unobstructed to facilitate application of a shackle to the dangling leg of an animal; a landing apron located to receive the animal released through the exit opening of the conveyor; a bleeding conveyor disposed alongside the restraining conveyor and including a shackle carrier movable in the general direction of advancement of the inner reaches of the restraining conveyor, said carrier comprising a series of shackles each having a free end, and an opposite end anchored to the carrier, said carrier presenting the free ends of the shackles for attachment to a leg of the animal near said exit opening.

12. The apparatus as defined by claim 11, wherein the bleeding conveyor at the location of the landing apron is inclined upwardly for bodily lifting the animal from the apron by its shackled leg.

13. The apparatus as defined by claim 11, wherein the bleeding conveyor at the location of the landing apron is inclined upwardly for bodily lifting the animal by its shackled leg from said landing apron.

14. The apparatus as defined by claim 13, wherein the landing apron includes an inclined upper slide surface sloped to slidingly direct the shackled leg of the animal toward the bleeding conveyor.

15. The apparatus as defined by claim 14, wherein the length of the overhang provided by said cantilever support means is not substantially less than the length of a mature beef animal.

16. The apparatus as defined by claim 11, wherein the length of the overhang provided by said cantilever support means approximates the length of a beef animal.

17. The apparatus as defined by claim 11, wherein the length of the overhang provided by said cantilever support means is not substantially less than the length of a mature beef animal.

18. The apparatus as defined by claim 17, wherein is included a stunning device located above said overhang.

* * * * *